US008295308B2

(12) United States Patent
Iyengar (10) Patent No.: US 8,295,308 B2
(45) Date of Patent: Oct. 23, 2012

(54) SYSTEMS AND METHODS OF CONFIGURING A RESOURCE POOL AS A NETWORK END POINT

(75) Inventor: Ranganath Gorur Kirshna Iyengar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/192,881

(22) Filed: Aug. 15, 2008

(65) Prior Publication Data

US 2010/0040058 A1 Feb. 18, 2010

(51) Int. Cl.
*H04J 3/24* (2006.01)
(52) U.S. Cl. ........ 370/473; 370/351; 370/390; 370/487; 370/542; 709/244
(58) Field of Classification Search .................. 370/252, 370/265, 328, 338, 352, 351, 389, 390, 391, 370/392, 397, 393, 466, 473, 474, 487, 542; 709/222, 223, 224, 238, 240, 244, 247
See application file for complete search history.

(56) References Cited

U.S. PATENT DOCUMENTS

| | | | | |
|---|---|---|---|---|
| 6,408,001 B1* | 6/2002 | Chuah et al. | ................... | 370/392 |
| 6,604,147 B1* | 8/2003 | Woo | ............................... | 709/240 |
| 6,831,917 B1* | 12/2004 | Cheriton | ....................... | 370/392 |
| 7,177,956 B2* | 2/2007 | Mann et al. | ........................ | 710/5 |
| 7,466,697 B1* | 12/2008 | Raz et al. | ........................ | 370/389 |
| 7,525,994 B2* | 4/2009 | Scholte | ............................ | 370/474 |
| 7,649,913 B2* | 1/2010 | Lee et al. | ........................ | 370/529 |
| 2001/0027494 A1* | 10/2001 | Deo et al. | ........................ | 709/247 |
| 2002/0150101 A1* | 10/2002 | Kamrowski | ................... | 370/392 |
| 2002/0161891 A1* | 10/2002 | Higuchi et al. | ............... | 709/226 |
| 2003/0204578 A1* | 10/2003 | Yip et al. | ....................... | 709/222 |
| 2004/0037320 A1* | 2/2004 | Dickson | ........................... | 370/473 |
| 2004/0117513 A1* | 6/2004 | Scott | ............................ | 710/1 |
| 2004/0252721 A1* | 12/2004 | Lingafelt et al. | ............... | 370/473 |
| 2006/0109795 A1* | 5/2006 | Kamata et al. | ................. | 370/252 |
| 2006/0136976 A1* | 6/2006 | Coupe et al. | ..................... | 725/131 |
| 2006/0159084 A1* | 7/2006 | Shimizu et al. | ................. | 370/389 |
| 2006/0182152 A1* | 8/2006 | Bi et al. | ......................... | 370/542 |
| 2006/0227752 A1* | 10/2006 | Sashihara | ...................... | 370/338 |
| 2006/0253564 A1* | 11/2006 | Shiga et al. | ...................... | 709/223 |
| 2008/0056140 A1* | 3/2008 | Shida et al. | ..................... | 370/242 |
| 2008/0089317 A1* | 4/2008 | Murakami et al. | ............ | 370/352 |
| 2008/0145050 A1* | 6/2008 | Mayer et al. | .................... | 398/49 |
| 2009/0323686 A1* | 12/2009 | Dyck et al. | ..................... | 370/389 |

* cited by examiner

*Primary Examiner* — Hassan Phillips
*Assistant Examiner* — Ajay Cattungal (57) ABSTRACT

A resource pool aggregator is disclosed. The resource pool aggregator facilitates a faster data communication between resource pools. The resource pool aggregator includes a plurality of network interfaces to receive and send data packets. A packet collector module couple of the plurality of network interfaces is included to process and route the data packets. A data store coupled to the packet collector module is provided to store IP addresses of computers in the resource pools.

14 Claims, 6 Drawing Sheets

SYSTEMS AND METHODS OF CONFIGURING A RESOURCE POOL AS A NETWORK END POINT

BACKGROUND

A virtualization software (e.g., a hypervisor) creates a hardware partitioning and a runtime environment for executing a plurality of virtual computers on a hardware platform. A resource pool can be created by grouping a plurality of physical and/or virtual computers that are executing on one or more hardware platforms. However, a resource pool is only a logical grouping of computers. To that end, data from a computer in a resource pool is directly sent to another computer in another resource pool. That is, an existence of a resource pool does not play any role in the data communication among the computers in resource pools.

SUMMARY

In one embodiment, a resource pool aggregator is disclosed. The resource pool aggregator facilitates a faster data communication between resource pools. The resource pool aggregator includes a plurality of network interfaces to receive and send data packets. A packet collector module couple of the plurality of network interfaces is included to process and route the data packets. A data store coupled to the packet collector module is provided to store IP addresses of computers in the resource pools.

In another embodiment, a method of data communication between resource pools is provided. Each of the resource pools has a plurality of computers. The method includes receiving a plurality of data packets from one or more computers in a resource pool, during a selected period of time and determining a destination computer for each of the plurality of data packets by reading a destination IP address in each of the plurality of data packets. A destination resource pool for the destination computers is then determined. Then, the data packets that are destined for the destination resource pool are merged and an IP header is added to the merged data packet. The IP header includes an IP address of a resource pool aggregator of the destination resource pool, the resource pool aggregator being in communication with an IP network. The merged data packet is then sent to the IP network.

In yet another embodiment, a computer readable media having programming instructions to provide data communication between resource pools is provided. Each of the resource pools has a plurality of computers. The computer readable media includes programming instructions for receiving a plurality of data packets from one or more computers in a resource pool, during a selected period of time and programming instructions for determining a destination computer for each of the plurality of data packets by reading a destination IP address in each of the plurality of data packets. In addition, the computer readable media includes programming instructions for determining a destination resource pool for the destination computer, programming instructions for merging data packets in the plurality of data packets that are destined for the destination resource pool, programming instructions for adding an IP header to the merged data packet, the IP header including an IP address of a resource pool aggregator of the destination resource pool, the resource pool aggregator being in communication with an IP network, and programming instructions for sending the merged data packet to the IP network.

DETAILED DESCRIPTION

Figure 1:
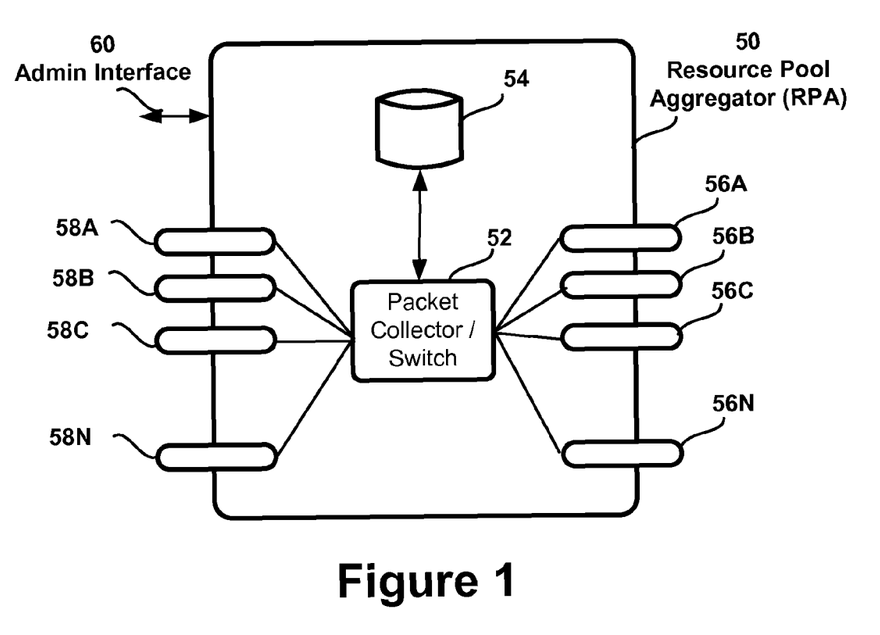
FIG. 1 illustrates an exemplary resource pool aggregator (RPA) in accordance with one or more embodiments of the present invention.

FIG. 1 shows a resource pool aggregator (RPA) 50. RPA 50 includes one or more incoming virtual or physical network interfaces 58A-58N and one or more outgoing virtual or physical network interfaces 56A-56N. In one or more embodiments, a same network interface can act as an outgoing network interface and an incoming network interface. In one embodiment, each of incoming network interfaces 58A-58N and outgoing network interfaces 56A-56N is capable of receiving and transmitting data packets. RPA 50 includes a Packet Collector/switch module 52, which provides, in one embodiment, a temporary storage for incoming and outgoing data packets. In addition, Packet Collector/switch module 52 also processes incoming and outgoing data packets. This processing of data packets is discussed in details later in this document. Packet Collector/switch 52 also includes a switching logic that provides routing of the processed data packets to their destinations. In one or more embodiments, RPA 50 includes a data store 54 to store IP addresses of physical or virtual machines in various resource pools. In one or more embodiments, data store 54 is also used for storing configuration information of RPA 50. In one embodiment, data store 54 includes non-volatile memory to store IP address tables, the IP address tables providing space for storing IP addresses of a plurality of computers (virtual and physical) and RPA in a IP network. Data store 54 is coupled to Packet Collector/switch 52, which uses virtual server IP addresses stored in data store 54 to route the processed data packets to their destinations in the network. In one embodiment, data store 54 is not a part of RPA 50; rather data store 54 exits at a central location (that is, in a computer) that is accessible to RPA 50. In one or more embodiments, RPA 50 includes an admin interface 60 to enable configuration of RPA 50. In one embodiment, a process of configuring an RPA includes entering or editing network parameters, IP address tables in data store 54, etc. An admin module (not shown) is provided to enable RPA 50 to communicate with other RPAs in an IP network to retrieve a list of IP addresses of other virtual servers in the network. In another embodiment, RPAs in an IP network can exchange IP addresses using any commonly used application protocol.

In one or more embodiments, RPA 50 includes components to execute instructions for performing methods of processing and routing the data packets. These components include a processor, a memory, I/O interfaces and devices, etc. A discussion of these components is being omitted for the sake of clarity. In one or more embodiments, RPA 50 is implemented in a hypervisor and configured such that all data packets originating from any of the virtual computers in the hypervisor passes through RPA 50.

Figure 2:
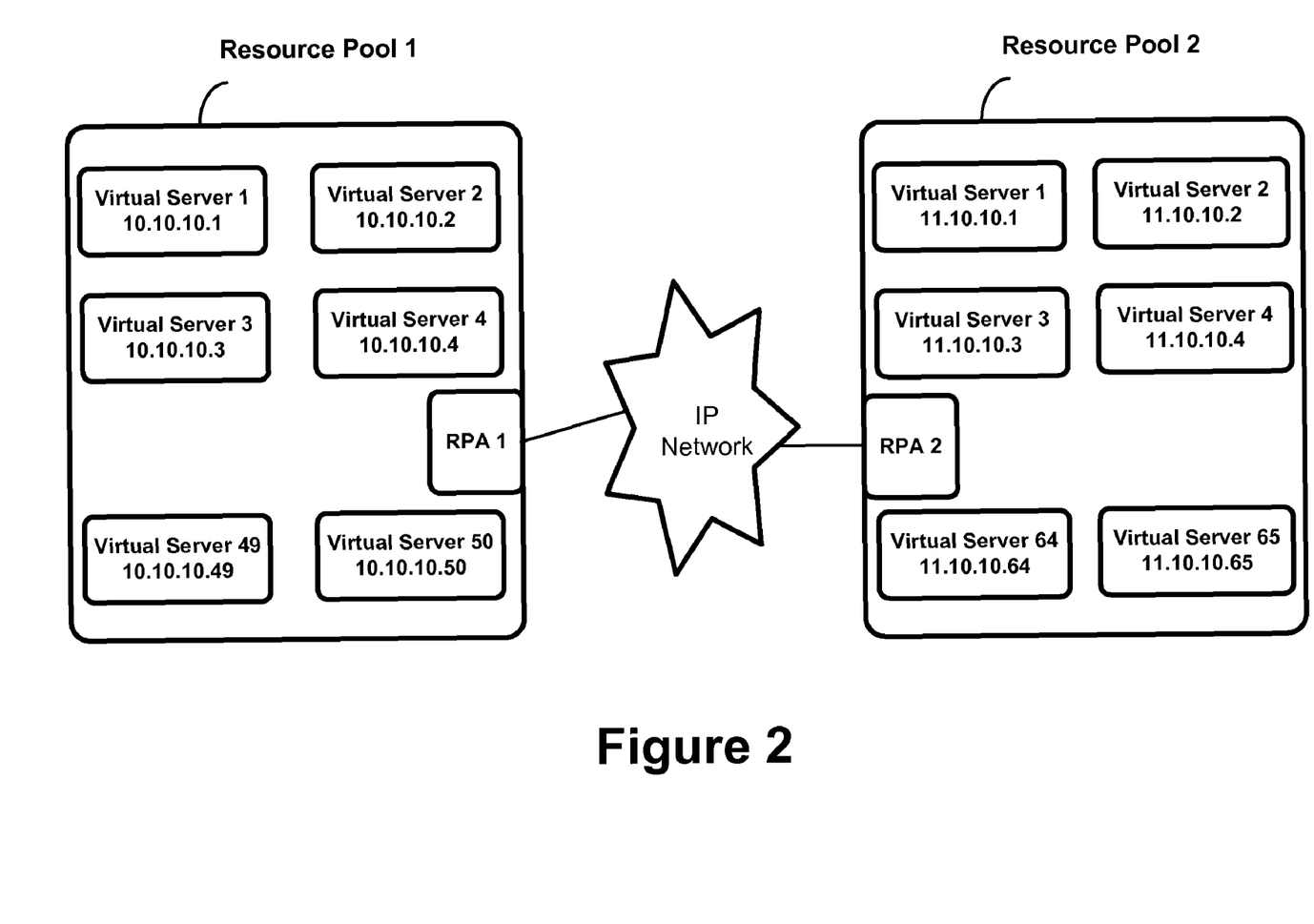
FIG. 2 illustrates resource pools including RPAs in accordance with one or more embodiments of the present invention.

FIG. 2 illustrates two resource pools in an Internet Protocol (IP) network. Resource Pool 1 is in communication with Resource Pool 2 through the IP network. Each of these resource pools has a plurality of virtual machines (that is, virtual computers). In one or more embodiments, a resource pool also includes physical machines without virtualization softwares and virtual machines. A virtual machine is a virtual computer that runs on a virtualization layer (such as a hypervisor—example—VMware ESX Server™) on a physical computer. It may be noted that the IP network can have any number of resource pools. In one or more embodiments, a resource pool includes an RPA. In other embodiments, one or more resource pools in an IP network may not include an RPA. In one or more embodiments, each computer (either virtual or physical) in a resource pool is enabled to communicate with other computers in the IP network without a use of an RPA. Each computer in each resource pools has an IP address. For example, Virtual Server 1 in Resource Pool 1 has an IP address 10.10.10.1. In addition, a separate IP address is assigned to each RPA in the IP network. In addition, the RPA and the virtual or physical servers in a resource pool are configured such that all data packets originating from the virtual servers passes through the RPA of the resource pool. In one example, in a blade enclosure in which each blade has its own network interface card, an RPA may be placed as a hardware as a part of the backplane which listens to all network packets from different blades.

Figure 3:
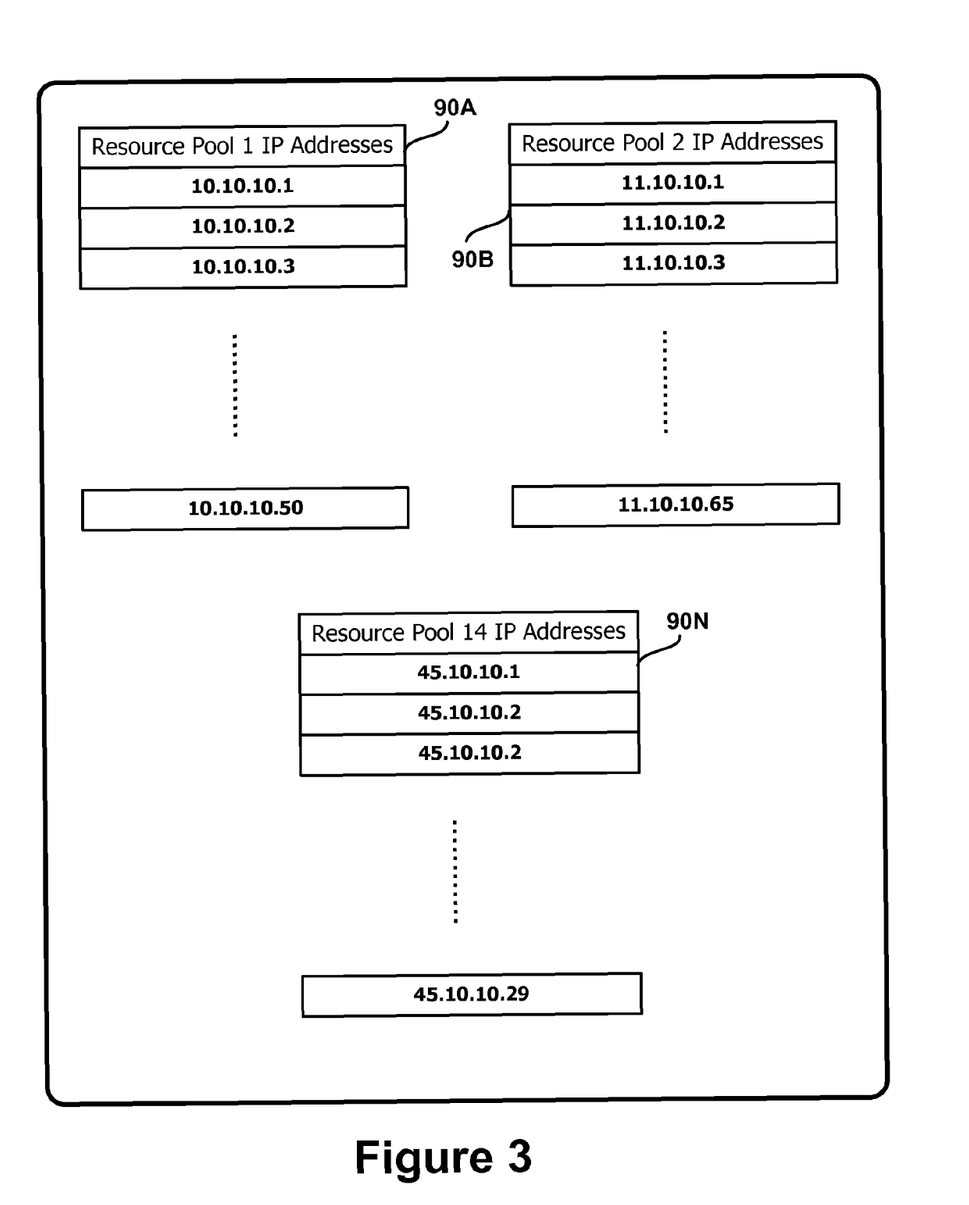
FIG. 3 illustrates exemplary IP address tables in accordance with one or more embodiments of the present invention.

FIG. 3 illustrates exemplary data tables 90A, 90B, 90N for storing IP addresses of various computers in an IP network. In one or more embodiments, the IP addresses are grouped by resource pools. In one embodiment, these data tables are stored in data stores of each RPA in the IP network. Each of these data tables includes IP addresses of each computer (virtual or physical) in each resource pool in the IP network. An IP address of an RPA is also stored along with the IP addresses of the computers in a resource pool to which the RPA is associated with. In one or more embodiments, the data in a data store is searchable and can be retrieved with the help of commonly used data programming interfaces (example, JDBC, ODBC, RDBMS native interface, etc.). When a computer is added to any of the resource pool in the IP network, the IP address of the newly added computer is transmitted to each RPA in the IP network. The IP address is then added to an appropriate table or location in the data store of the RPA. In one embodiment, a centralized data store is provided to store the IP address data. This centralized data store is accessible to all RPAs in an IP network. Hence, in this embodiment, when a new computer (virtual or physical) is added, the IP address of this new computer needs to be added to this central data store only. Similarly, when a computer (virtual or physical) is removed from an IP network, the IP address of this computer is removed from the data store.

Figure 4:
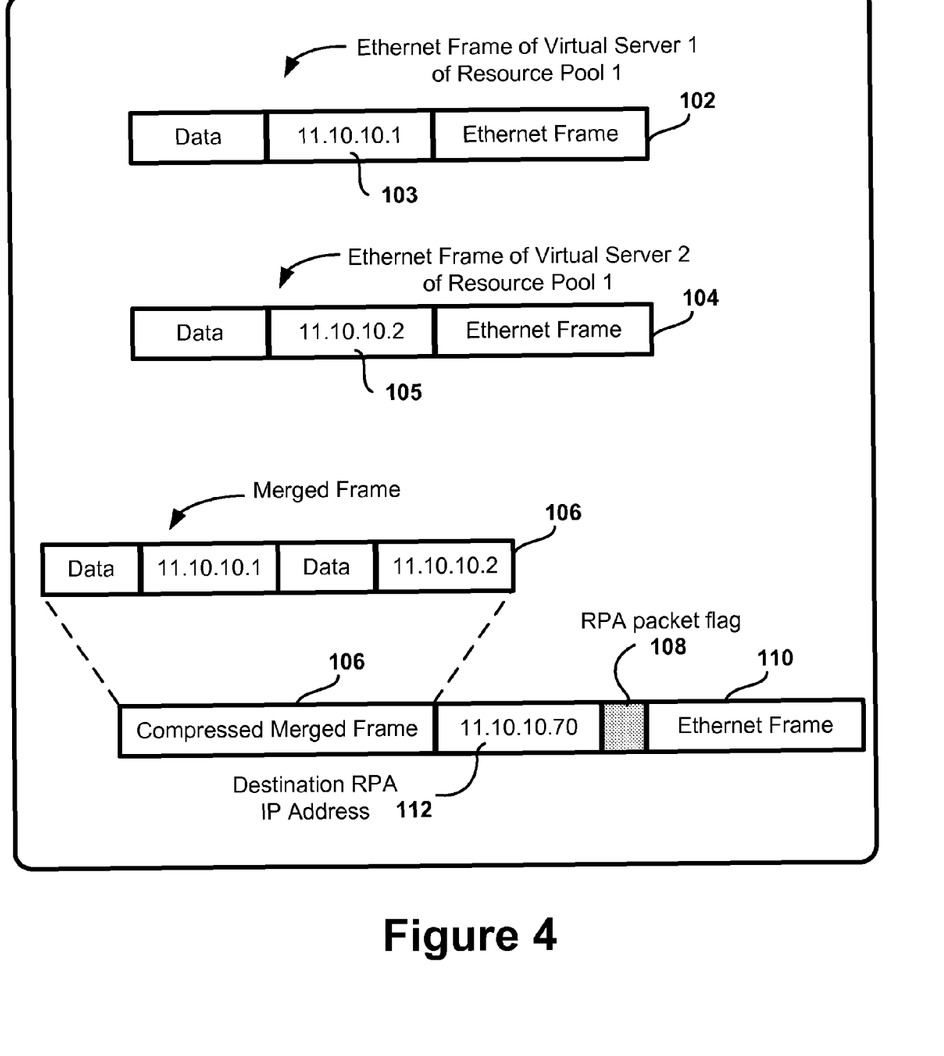
FIG. 4 illustrates exemplary merging of data packets in an RPA in accordance with one or more embodiments of the present invention.

FIG. 4 illustrates exemplary IP data packets 102, 104 and merging of these data packets to form an RPA packet 110. In this example, an IP data packet 102 originates from virtual server 1, which is located inside of resource pool 1. This IP data packet 102 includes a destination IP address 103 of virtual server 1 in resource pool 2. Similarly, another IP data packet 104 originates from virtual server 2 in resource pool 1 and includes a destination IP address 105 of virtual server 2 in resource pool 2. The structure of an IP data packet is well known, hence, a full structure and related details are being omitted for the sake of clarity.

The RPA of resource pool 1 receives these IP data packets 102, 104 and determines that both of these IP data packets are destined to resource pool 2. Such determination is made by looking up IP addresses of various servers, which are stored in a data store (see FIG. 3). The data store of the RPA of resource pool 1 also provides the IP address of the RPA of resource pool 2. Since IP data packets 102, 104 are destined to the same resource pool, the RPA of resource pool 1 merges IP data packets 102, 104 to create a merged data packet 106. In one embodiment, the merged data packet 106 is compressed to reduce the size of merged data packet 106. The compression of the data packets may be achieved through a selected or a commonly available compression algorithm (example—link compression, bulk compression, guess table based compression, etc.) The RPA then adds IP address 112 of the RPA of resource pool 2 and an RPA packet flag 108 to indicate that this newly created data packet 110 is to be processed by an RPA at the destination.

Figure 5:
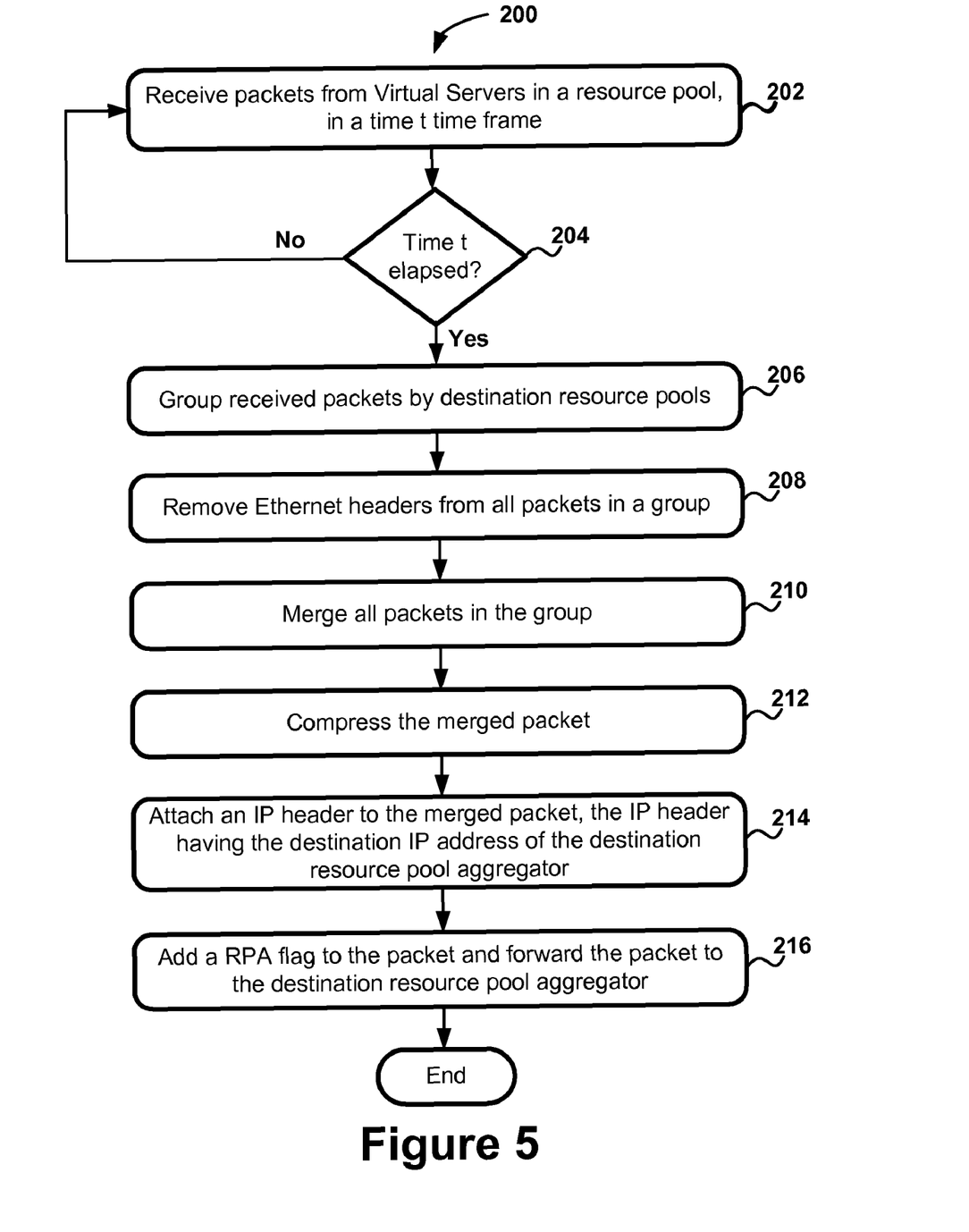
FIG. 5 illustrates a flow diagram of merging data packets to form RPA packets in accordance with one or more embodiments of the present invention.

FIG. 5 illustrates a flow diagram 200 of merging a plurality of IP data packets and transmitting the merged data packet to the destination RPA. At step 202, an RPA of a resource pool receives IP data packets from virtual servers in a resource pool. At decision step 204, the RPA waits for a selected period of time (time t) to collect the outgoing data packets from various virtual servers in a resource pool. In one embodiment, time t is selected to optimize data communication performance or data throughput. At step 206, data packets are grouped by the destination resource pool. In one example, all data packets received by an RPA during a selected period of time and destined for a same resource pool are grouped together. In one or more embodiment, after the data packets are received and grouped during a selected period of time, the groups are inspected and the groups containing only one packet are deleted and the packet is sent unaltered to the RPA of the destination resource pool. In another embodiment, the group size is selectable. Hence, only the groups that contain less than a selected number of data packets are discarded and the data packets are sent unaltered to the destination RPA. This size can be selected to optimize the throughput of data communication. The packets are each of the remaining groups are merged and compressed as discussed in FIG. 4 and the merged packets are passed on to the network stack.

At step 208, the header information is stripped from all data packets and at step 210, the data packets are merged to form an RPA data packet. At step 212, the merged data packet is compressed to reduce the size of the RPA data packet. At step 214, the IP header information, including the IP address of a destination RPA, is then added to the RPA data packet. At step 216, an RPA flag is added to the merged data packet and the merged data packet is then forwarded to the destination RPA.

Figure 6:
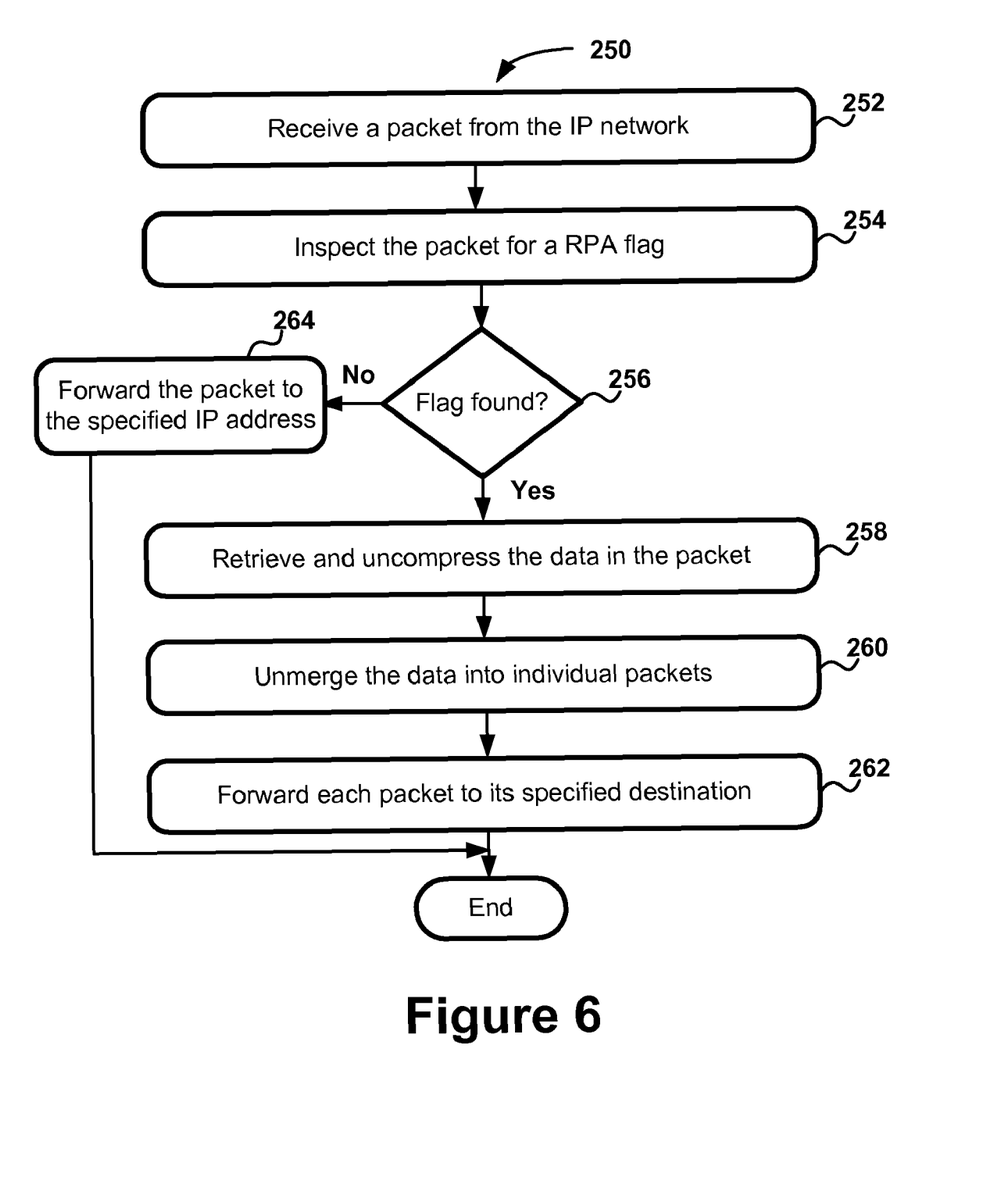
FIG. 6 illustrates a flow diagram of splitting an RPA packet into data packets in accordance with one or more embodiments of the present invention.

FIG. 6 illustrates a flow diagram 250 of retrieving individual IP data packets from an RPA data packet. At step 252, a data packet is received at an RPA that is connected to an IP network. At step 254, the RPA inspect the data packet for an RPA flag. At decision step 256, if an RPA flag is not found in the data packet, then at step 264 the data packet is forwarded to its destination virtual server. If an RPA flag is found, at step 258, data is retrieved from the data packet and the data is then uncompressed. At step 260, the uncompressed data is unmerged to retrieve individual IP data packets. At step 262, necessary IP header information is added to the individual data packets and each of them is forwarded to its destination virtual server in the resource pool.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of data communication between computers of different resource pools, the method comprising:

determining a resource pool destination address for each of a plurality of resource pools in which each resource pool includes a grouping of a plurality of computers having individual computer-specific destination addresses;

collecting data packets originating from first computers of a first resource pool, the first resource pool being a grouping of a plurality of the first computers, the collected data packets not including a destination address for a resource pool;

accessing computer-specific destination addresses identified within the collected data packets, the computer-specific destination addresses being addresses assigned to computers to which the collected data packets are targeted;

identifying a plurality of the collected data packets that contain computer-specific destination addresses of second computers of a second resource pool using a table relating computer-specific destination addresses to destination addresses for resource pools based on the computer-specific destination addresses identified within the collected data packets and not a destination address for the second resource pool, the second resource pool being a grouping of a plurality of the second computers;

removing at least a portion of header information from the plurality of collected data packets that are identified as containing the computer-specific destination addresses of the second computers;

following the removal of the header information, merging the plurality of collected data packets that are identified as containing the computer-specific destination addresses of the second computers, thereby forming a merged data packet;

attaching header information to the merged data packet so as to the include the destination address for the second resource pool; and transmitting the merged data packet on the basis of the resource pool-specific destination address.

2. The method of claim 1 further comprising adding a packet flag to the merged data packet prior to transmission so as to identify the merged data packet as including a plurality of data packets, such that the second resource pool is enabled to identify the merged data packet as being the plurality of collected data packets of different computer-specific destination addresses.

3. The method of claim 1 further comprising compressing the merged data packet prior to transmission.

4. The method of claim 1 wherein the table includes a destination address of each second computer is included, and wherein the merging includes merging data packets having different computer-specific destination addresses.

5. The method of claim 1 wherein each of the first resource pool and the second resource pool is a group of virtual machines, such that each virtual machine has an assigned computer-specific destination address and is included within a resource pool having an assigned resource pool-specific destination address, wherein attaching the header information includes attaching the assigned resource pool-specific destination address.

6. A non-transitory computer readable storage media having programming instructions to provide data communication between resource pools, each of the resource pools having a plurality of computers, the computer readable storage media comprising:
   programming instructions for determining a resource pool destination address for each of a plurality of resource pools in which each resource pool includes a grouping of a plurality of computers having individual computer-specific destination addresses;
   programming instructions for collecting data packets originating from first computers of a first resource pool, the first resource pool being a grouping of a plurality of the first computers, the collected data packets not including a destination address for a resource pool;
   programming instructions for accessing computer-specific destination addresses identified within the collected data packets, the computer-specific destination addresses being addresses assigned to computers to which the collected data packets are targeted;
   programming instructions for identifying a plurality of the collected data packets that contain computer-specific destination addresses of second computers of a second resource pool using a table relating computer-specific destination addresses to destination addresses for resource pools based on the computer-specific destination addresses identified within the collected data packets and not a destination address for the second resource pool, the second resource pool being a grouping of a plurality of the second computers;
   programming instructions for removing at least a portion of header information from the plurality of collected data packets that are identified as containing the computer-specific destination addresses of the second computers;
   programming instructions for merging the plurality of collected data packets that are identified as containing the computer-specific destination addresses of the second computers, thereby forming a merged data packet;
   programming instructions for attaching header information to the merged data packet so as to the include the destination address for the second resource pool; and
   programming instructions for transmitting the merged data packet on the basis of the resource pool-specific destination address.

7. The method of claim 6 further comprising programming instructions for adding a packet flag to the merged data packet prior to transmission so as to identify the merged data packet as including a plurality of data packets, such that the second resource pool is enabled to identify the merged data packet as being the plurality of collected data packets of different computer-specific destination addresses.

8. The method of claim 6 further comprising programming instructions for compressing the merged data packet prior to transmission.

9. The method of claim 6 wherein each of the first resource pool and the second resource pool is a group of virtual machines, such that each virtual machine has an assigned computer-specific destination address and is included within a resource pool having an assigned resource pool-specific destination address, wherein the programming instructions for attaching the header information includes attaching the assigned resource pool-specific destination address.

10. A method of data communication between computers of different resource pools, the method comprising:
   determining a resource pool destination address for each of a plurality of resource pools in which each resource pool includes a resource pool aggregator and includes a grouping of a plurality of computers having individual computer-specific destination addresses, wherein each resource pool destination address is unique to the resource pool aggregator of the resource pool;
   collecting data packets originating from first computers of a first resource pool, the first resource pool being a grouping of a plurality of the first computers, the collected data packets not including a destination address for a resource pool;
   accessing computer-specific destination addresses identified within the collected data packets, the computer-specific destination addresses being addresses assigned to computers to which the collected data packets are targeted;
   identifying a plurality of the collected data packets that contain computer-specific destination addresses of second computers of a second resource pool using a table relating computer-specific destination addresses to destination addresses for resource pools based on the computer-specific destination addresses identified within the collected data packets and not a resource pool destination address for the second resource pool, the second resource pool being a grouping of a plurality of the second computers, the identifying including selecting computer-specific destination addresses assigned to a plurality of second computers;
   merging the plurality of collected data packets that are identified as containing the computer-specific destination addresses of the second computers, thereby forming a merged data packet;
   attaching header information to the merged data packet so as to include the resource pool destination address of the resource pool aggregator of the second resource pool, wherein exchanges of data packets between the first computers and the second computers without use of the resource pool aggregator are enabled but attaching the header information being such that the merged data packet is addressed to the resource pool aggregator; and
   transmitting the merged data packet to the resource pool aggregator.

11. The method of claim 10 further comprising adding a packet flag to the merged data packet prior to transmission so as to identify the merged data packet as including a plurality of data packets.

12. The method of claim 10 further comprising compressing the merged data packet prior to transmission.

13. The method of claim 10 wherein the table includes a destination address of each second computer.

14. The method of claim 10 wherein each of the first resource pool and the second resource pool is a group of virtual machines, such that each virtual machine has an assigned computer-specific destination address and is included within a resource pool having an resource pool aggregator having an assigned resource pool destination address, wherein attaching the header information includes attaching the resource pool destination address of the resource pool aggregator of the second resource pool.

* * * * *